United States Patent

Pear, Jr.

[15] 3,665,485

[45] May 23, 1972

[54] METHOD AND SYSTEM FOR HIGH DENSITY RECORDING OF INFORMATION ON PREMAGNETIZED MAGNETIC TAPE

[72] Inventor: Charles B. Pear, Jr., Greenlawn, N.Y.

[73] Assignee: Potter Instrument Company, Inc., Plainview, N.Y.

[22] Filed: June 11, 1969

[21] Appl. No.: 832,316

[52] U.S. Cl. ....................................346/74 M, 340/174.1 G
[51] Int. Cl. ....................................G11b 5/06
[58] Field of Search ....................................346/74 M; 340/174.1 G

[56] References Cited

UNITED STATES PATENTS

| | | | |
|---|---|---|---|
| 2,882,518 | 4/1959 | Buhrendorf | 340/174.1 G |
| 2,917,726 | 12/1959 | Golden | 340/174.1 G |
| 3,503,059 | 3/1970 | Ambrico | 346/74 M |

*Primary Examiner*—Howard W. Britton
*Attorney*—Irons, Sears, Staas, Halsey and Santorelli

[57] ABSTRACT

A method and system for recording information on a premagnetized magnetic media, such as a magnetic tape, employs an unsymmetrical write current wave form. When recording to produce a transition from the direction of magnetization of the media to the reverse direction, the current through the recording head is initially increased to a relatively large value for a short interval and then reduced to a lesser value, comprising respectively an overdrive or step pulse of relatively high current amplitude followed by a pedestal level, or lower amplitude of recording current is maintained until the next transition is recorded. When recording a transition from the now established opposite direction of magnetization to that of the premagnetized direction, the recording current is initially increased to a large value, but of opposite polarity, for a short interval, comprising a return step pulse, after which the current is reduced to zero until the next transition is recorded. There results high recording densities wherein the recorded transitions may be read with high resolution and without undesirable interference, the reading of both switching and return transitions with either forward or reverse motion of the tape producing output pulses of substantially identical shape and of substantially identical timing.

13 Claims, 15 Drawing Figures

INVENTOR
CHARLES B. PEAR, JR.

BY Brufsky and Staas
ATTORNEYS

INVENTOR
CHARLES B. PEAR, JR

BY Brufsky and Staas
ATTORNEYS

INVENTOR
CHARLES B. PEAR, JR

BY Brufsky and Staas
ATTORNEYS

METHOD AND SYSTEM FOR HIGH DENSITY RECORDING OF INFORMATION ON PREMAGNETIZED MAGNETIC TAPE

BACKGROUND OF THE INVENTION

1. Field of the Invention

Generally, this invention relates to high density digital magnetic recording systems and, more particularly, to an improved method and system for recording transitions on a premagnetized tape.

2. Description of the Prior Art:

Binary information is stored on a magnetic medium by revising the magnetization of the medium as the medium is transported past the gap of a suitable magnetic transducer write head. The principal component of magnetic flux produced by the recording head is in the direction of or opposite to the tape motion and thus a flux transition represents a 180° reversal of the magnetic flux vector.

The magnetic medium typically is provided as a coating on a flexible backing material such as Mylar. Standards have been established for such magnetic tape and, particularly for computer interchange, provide for a standard thickness of the coating of 0.6 mil and for DC-erasing of the tape in accordance with a prescribed polarity. The DC-erasing thus comprises premagnetization of the tape in accordance with that prescribed polarity.

Ideally, the flux transition occupies substantially zero distance, or an infinitesimally small distance, along the tape. However, for various reasons including the finite transition time of the recording field combined with the interaction between the adjacent flux-reversed regions, the flux transition is always spread over a finite distance.

At low recording densities, such as 800 FCI (flux changes per inch) or less, the write current may be large enough to nearly saturate the coating—i.e., effect flux reversal throughout the entire thickness of the coating. As a result, in reading the recorded information, switched and return output pulses of nearly the same amplitude and waveshape are generated in response to sensing of either the switching transitions, in which the magnetization of the coating is reversed from its premagnetized, or DC-erased condition, or the return transitions in which this initial premagnetized condition is restored. However, at higher recording densities, full saturation cannot be achieved because the pulse widths produced by saturated recordings are too long and interfere with each other when read.

Heretofore in the prior art, the write current has been reduced so that the magnetization of a thinner layer of the coating is reversed in the recording operation. The compromise thus effected to optimize density, however, results in switched and return output pulses resultant from sensing the switching and return transitions which are dissimilar both in amplitude and pulse shape. For example, the reduction in the rate of change of the reversing magnetic field at the gap of the write head causes the switching transition to occur over a greater length of tape, as the latter is transported past the write head gap, than that resultant from the return transition. As a result, the switched output pulse obtained from the switching transition is of longer duration and smaller amplitude due to the smaller write current employed.

A system incorporating a magnetic recording circuit for improving upon the unsatisfactory characteristics of such switching transitions is disclosed in U.S. Pat. No. 3,267,483—Gabor, assigned to the assignee of the present invention. As discussed in that patent, an improvement of the switching transition may be effected by providing an overdrive current or step pulse during the initial portion of a switching pulse which exceeds the amplitude of the current required for the steady state magnetization in effecting recording to produce a faster rise in the magnetic flux build-up. The invention of that patent provides for selectively controlling the characteristics of the described overdrive current in accordance with the desired time interval for build-up of the magnetic flux in the transducer or recording head.

Methods and systems of the prior art typically have employed current pulses of symmetrical waveshape but opposite polarity to effect the control of magnetization of the tape in recording information.

SUMMARY OF THE INVENTION

In accordance with the invention, the high density writing of information on a premagnetized magnetic tape of a magnetic tape recording system is effected through use of a write current having an unsymmetrical waveform and including switching and return current pulses of different waveshapes in accordance with the functions required to be performed thereby in the control of magnetization of the tape for recording of information. Particularly, the invention recognizes that, when writing on DC-erased, premagnetized magnetic tape, it is not necessary for the return pulse to perform a holding function to maintain a steady state flux level or magnetization level of the tape prior to the next switching pulse. By contrast, the switching pulse must effect a rapid initial reversal of the flux direction and maintain that reversal at a steady state level until the return transition. Both the switching and return pulses, however, must effect a rapid transition of the flux direction for recording.

The invention thus provides for an overdrive or step pulse to effect recording of transitions both in switching from the premagnetized direction to the reverse direction, and in returning to the premagnetized direction of magnetization of the medium. Only following the switching pulse, however, is there provided a pedestal level of recording current for maintaining the switched or reverse direction of magnetization.

The recording current, and thus the magnetic field in the gap of the write head, is reduced (to zero, or a minimal value in one specific embodiment of the invention) following the return step pulse presenting a more favorable condition for effecting a rapid switching transition by the next switching pulse.

The utilization of switching and return recording current pulses of the characteristics described presents a favorable condition for writing on a DC-erased, or premagnetized tape. In subsequent reading of the tape, there are produced output pulses resultant from sensing of switching and return transitions of substantially identical waveshape, of maximum amplitude for the permissible pulse width or duration thereof, and of nearly identical timing when read either with forward or reverse motion of the tape. Optimizing the recording conditions in accordance with the invention as hereinabove described is of particular significance for high recording densities, especially when the densities are so high that the penetration of the magnetic coating in response to the switching field must be restricted to less than full thickness of the coating.

The invention also provides for controlling, through active circuits, the duration and amplitude of the step pulses produced for generating both the switching and return transitions to further optimize the benefits thereof.

These and other features and advantages of the method and system of the invention will become apparent and be more fully understood from the following detailed description of the invention.

DETAILED DESCRIPTION OF THE PREFERRED EMBODIMENT

Prior to a detailed description of the preferred embodiment of the invention, it is instructive to briefly consider in somewhat more detail the techniques employed in the prior art for effecting recording of information on a magnetic tape and particularly under conditions in which the density of recording does not permit full saturation of the magnetic coating for the reasons hereinabove explained.

Figure 1A:
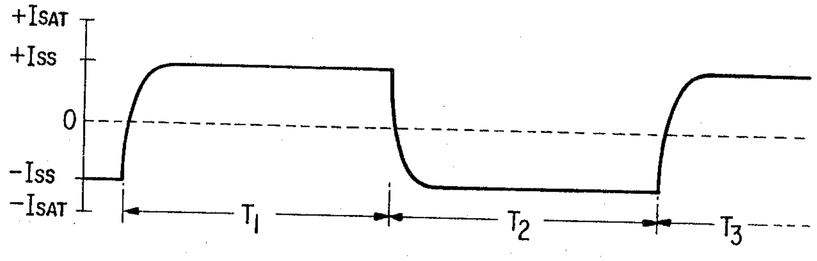
FIG. 1A PRIOR ART
FIG. 1A shows a waveform of a conventional write current for a magnetic recording system of the prior art.

In FIG. 1A is shown a schematic representation of a waveform of a write current employed under the conditions described. The waveform is shown for a switching interval $T_1$, a return interval $T_2$, and a portion of a second switching interval $T_3$. The waveform is substantially symmetrical about the zero current axis and extends between negative and positive steady state levels ($\pm I_{ss}$). Each of the positive and negative steady state levels are of equal amplitude, and less than the corresponding positive and negative saturation current levels ($\pm I_{sat}$). By so limiting the current amplitude, the rate of current increase from $-I_{ss}$ to $+I_{ss}$ at the initiation of each switching interval, such as $T_1$, and $T_3$, is relatively slow. The return transition at the initiation of the return interval $T_2$ is effected by the leading edge of the return pulse, at the termination of interval $T_1$, and shown to be similar but of opposite polarity to that of the switching pulse. The rate of current decrease from $+I_{ss}$ to $-I_{ss}$ at the initiation of the return interval $T_2$ is therefore also relatively slow.

Figure 1B:
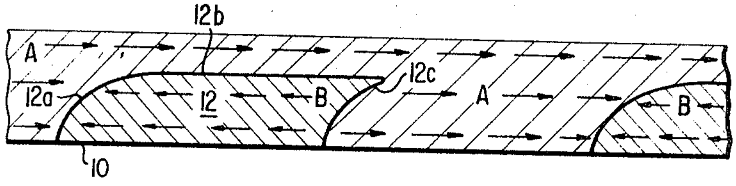
FIG. 1B PRIOR ART
FIG. 1B comprises a greatly enlarged cross-section of the magnetic coating of a premagnetized magnetic tape including an illustrative representation of the switched regions resultant from a write current in accordance with the waveform of FIG. 1A.

In FIG. 1B is shown a cross-section of a magnetic coating 10 of a magnetic tape (the backing of which is not shown), on a greatly magnified scale and in which is schematically represented by the cross-hatched region 12, the resultant reverse magnetization in the tape produced by a writing head energized by the current waveform of FIG. 1A during the switching intervals $T_1$ and $T_3$. The noted slow increase in current at the beginning of interval $T_1$ results in a slow transition from the premagnetized condition of the tape 10 represented by the arrows A to the reverse magnetization represented by the arrows B, and defined by the boundary **12*a*. The extent of reversed magnetization represented by boundary 12*b* corresponds to the magnetization capable of being achieved by the amplitude $I_{ss}$ of the write current, and which is less than the current level $I_{sat}$ required for full penetration or saturation of the entire cross-section of the tape 10. The similarly slow transition of the write current from $+I_{ss}$ to $-I_{ss}$ results in a slow transition from the switched state of magnetization represented by arrows B to the premagnetized condition represented by arrows A. The return transition is represented by the boundary 12*c*, in which a gradual return from the direction of reverse magnetization B to the premagnetization direction A is effected. It will be appreciated that none of the boundaries 12*a*, 12*b*, and 12*c*** is well defined but rather represents a transition band.

Figure 2A:
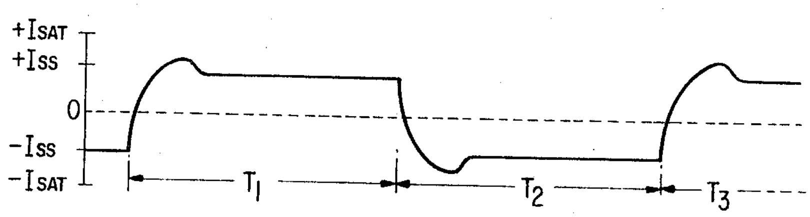
FIG. 2A PRIOR ART
FIG. 2A shows a waveform of a conventional write current having an overdrive, or step pulse, for effecting both switching and return transitions as employed for a magnetic recording system of the prior art.

FIG. 2A is a waveform similar to that of FIG. 1A but in which at the initiation of the switching interval $T_1$ there is provided an overdrive of the switching current pulse, or a switching step pulse. This switching step pulse extends above the steady state level $I_{ss}$ and may approach or exceed the saturation level $I_{sat}$. Following the switching step pulse, a pedestal level of current corresponding to the steady state current required for the desired degree of steady state reverse magnetization of the coating is provided. Again, the waveform is symmetrical about the zero current axis and thus includes a similar overdrive at the initiation of the return interval $T_2$ and thus a return step pulse, followed by a pedestal level corresponding to the write current amplitude for steady state magnetization, but of reverse polarity, shown as $-I_{ss}$.

Figure 2B:
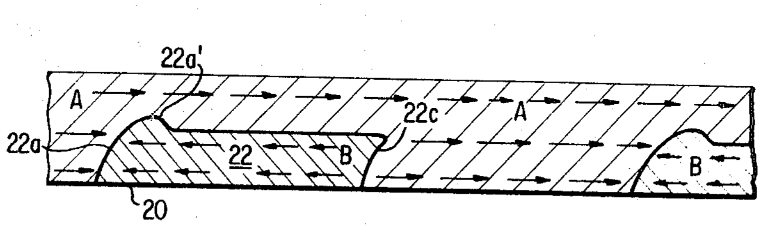
FIG. 2B PRIOR ART
FIG. 2B comprises a greatly enlarged cross-section of the magnetic coating of a premagnetized magnetic tape including an illustrative representation of the switched regions resultant from a write current in accordance with the waveform of FIG. 2A.

In FIG. 2B, the reverse magnetized region is shown at 22, similar to the region 12 in FIG. 1B. The overdrive pulse provided by the write current of FIG. 2A now results, however, in a much more rapid transition from the direction A of premagnetization to the reverse direction B as schematically represented by the more rapidly rising boundary **22*a*. Depending on the amplitude of the overdrive or step pulse, an overshoot 22*a'* may result in the reverse magnetized region 22. The overdrive of the return pulse at the initiation of the return interval $T_2$ also serves to define a boundary 22*c*** at the return transition which is much sharper.

Similarly to FIG. 1A, the return current pulse in FIG. 2A is similar to the switching current pulse but of opposite polarity and thus includes a steady state level $-I_{ss}$. At the beginning of the switching interval $T_3$ in both FIGS. 1A and 2A, therefore, the current must increase from $-I_{ss}$ through zero current level to produce a magnetic field of reverse polarity for effecting reversal of the magnetization in the recording operation. The steady state magnetic field in the gap of the write head produced by the current $-I_{ss}$ must therefore be overcome prior to creating the reverse direction field required for recording.

It will thus be appreciated, as to the representation of the reverse magnetization region 22 in FIG. 2B, that the switching transition as schematically represented by the boundary **22*a*** is deleteriously affected and corresponds to a slower transition than would be possible if the switching current pulse at the initiation of switching interval $T_3$ did not have to increase from the negative steady state level $-I_{ss}$.

Figure 3A:
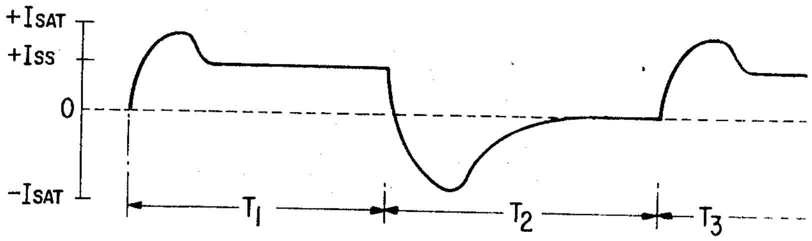
FIG. 3A shows a waveform of a write current in accordance with the invention having an overdrive or step pulse for effecting both switching and return transitions and a steady state level for maintaining a steady state switched condition.
Figure 3B:
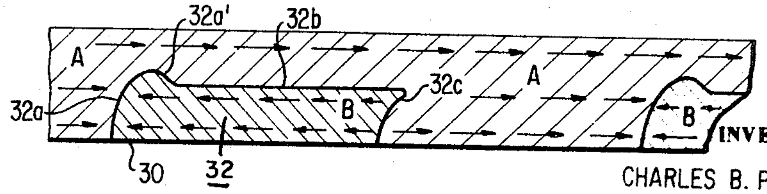
FIG. 3B comprises a greatly enlarged cross-section of the magnetic coating of a premagnetized magnetic tape including an illustrative representation of the switched regions resultant from a write current in accordance with the waveform of FIG. 3A.

In accordance with the invention, the undesirable results of employing a symmetrical waveshape as shown in FIG. 2A for achieving the switching transition are avoided by generating a waveform as shown in FIG. 3A. The waveform at the initiation of switching interval $T_1$, and thus that utilized for generating the switching transition, increases rapidly to a level in excess of the steady state level $I_{ss}$ through use of an overdrive or step pulse function. As described hereinafter, the invention provides for accurate control of the amplitude and duration of the overdrive, or step pulse. Following the step pulse, the write current remains at the steady state level $I_{ss}$ until termination of the switching interval $T_1$ and therefore until the initiation of return interval $T_2$. At that time, a step pulse of opposite polarity, but of identical waveform, is generated to effect the return transition. Following this return step pulse, however, the write current is reduced to zero level, and thus in advance of the next switching interval $T_3$. It should be noted that it may not be necessary to reduce the write current to zero, but only to some low level, if desired. With reference to FIG. 3B, it will be appreciated that the boundary **32*a* between the reverse magnetization region 32 and the preceding, premagnetized region of the tape 30 thereby represents a sharper switching transition. The reverse magnetization region 32, which also may include an overdrive portion 32*a'*, then returns to a level defined by boundary 32*b* corresponding to the steady state saturation condition until the return transition represented by the boundary 32*c***.

Figure 4:
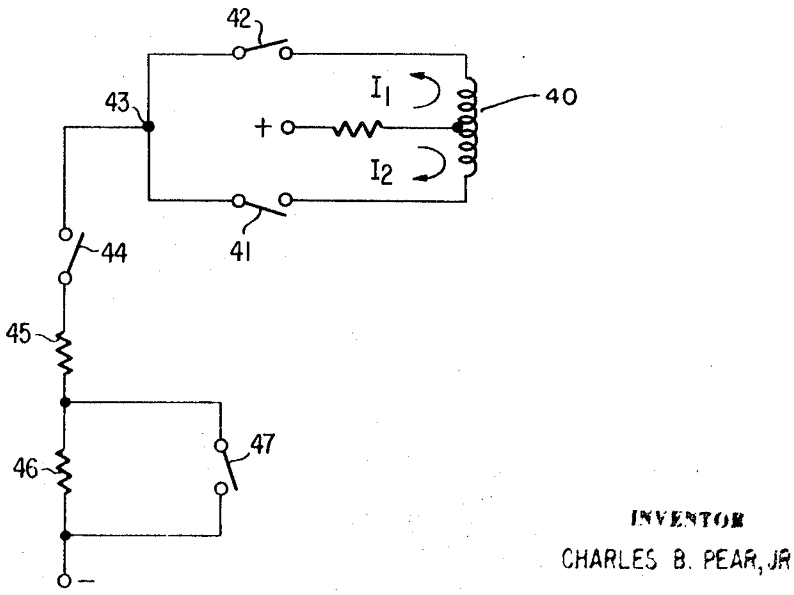
FIG. 4 is a simplified schematic of a circuit for generating a recording waveform in accordance with the invention.

In FIG. 4 is shown a simplified schematic of a circuit for generating write currents in response to input data in accordance with the invention. In FIGS. 5A through 5G are shown, variously, timing charts and currents waveforms which represent the operation of the circuit of FIG. 4.

In FIG. 4, the write head of a magnetic tape recording system is represented by a winding 40, a center tap of which is connected to a positive power supply terminal, and the opposite end terminals of which are connected to first terminals of switches 41 and 42. Second terminals of the switches 41 and 42 are connected at a common junction 43 through a series circuit of switch 44 and resistors 45 and 46 to a negative power supply terminal. A further switch 47 is connected between the series junction of resistors 45 and 46 and the negative power supply terminal and is effective, when closed, to short circuit the resistor 46. Resistors 45 and 46 comprise load current control resistors and, by short circuiting of resistor 46, the switch 47 provides for an increased amplitude load current. As will be explained in detail hereafter, this increased load current provides for the overdrive or step pulse employed in effecting the switching and return transitions. The amplitude of the overdrive current relative to the steady state current may be selected by adjusting the relative values of the resistors 45 and 46 and the absolute values of these currents by adjusting the absolute values of the resistors.

Figures 5A, 5B, 5C, 5D, 5E, 5F, 5G:
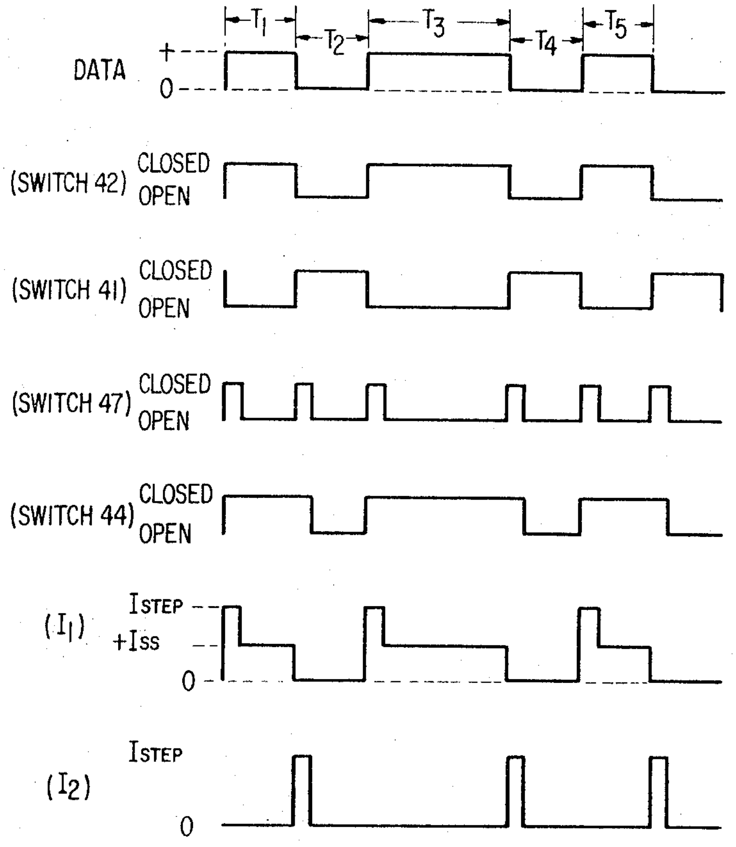
FIGS. 5A through 5G show variously, timing charts and current waveforms representing the operation of the circuit of FIG. 4.

Reference will be had concurrently to FIG. 4 and FIGS. 5A through 5G for describing the operation of the circuit of FIG. 4. Suitable logic and control circuits, not shown, may be provided to effect the switch actuation and to generate the current waveforms as shown in FIGS. 5F and 5G.

In FIG. 5A, the data to be recorded is represented by positive square wave pulses. In accordance with conventional magnetic recording codes, each leading and trailing edge of the data pulses, that is each data transition, represents a binary "1." The absence of a transition represents a binary "0." As shown in FIGS. 5B and 5C, switches 42 and 41 are alternately switched between open and closed conditions in response to the transitions of the pulse data input, in opposite phase relationship. Each positive going pulse transition of incoming data produces a switching transition defining the initiation of a switching interval, during which the magnetization of the premagnetized magnetic recording tape is switched and maintained in the switched condition. These switching intervals are identified as the intervals $T_1$, $T_3$, and $T_5$ in FIG. 5A. When a negative going pulse transition of incoming data is sensed, the switching current pulse is terminated, and a return transition is produced to initiate a return interval. The return intervals are defined by the intervals $T_2$, $T_4$ in FIG. 5A. For the configuration shown, the current $I_1$ which flows when switch 42 is closed, and thus during the write interval, comprises the write current pulse. An oppositely directed current $I_2$ is caused to flow during the return intervals $T_2$, $T_4$ by closure of switch 41 so as to effect a return transition whereby the magnetization of the medium resumes its premagnetized condition.

As described in detail above, a step pulse or overdrive is effected at both the initiation and the termination of each switching interval to effect rapid switching and return transitions. Switch 47 is, for this purpose, switched to a closed position to short circuit the load resistor 46 for a predetermined time interval upon detection of each leading and each trailing edge of the data pulse. A pedestal or steady state switching pulse is provided following the switching step pulse, but following the return step pulse, the current returns to zero, or a minimal value. Thus, there is no steady state pulse following the return step pulse.

The generation of such a waveform may be realized by logic circuitry responsive to the data waveform of FIG. 5A and to the step pulse waveform corresponding to the actuation of switch 47 of FIG. 5D. Thus, as shown in FIG. 5E, switch 44 is actuated to a closed position for the combined continous time intervals of each switching interval and the step pulse at the initiation of the return interval to complete an energizing circuit between the positive and negative power supply terminals and through the appropriate portion of the winding 40 in accordance with the selective actuation of switches 41 and 42. Switch 44 thus assures that current flow through the winding 40 terminates following the return step pulse, and does not resume until there occurs the leading edge of the next data pulse and, concurrently, the leading edge of the corresponding switching step pulse.

In accordance with the described function and operation of switch 47 in accordance with the timing chart of FIG. 5D, and during each closed interval of switch 42 in accordance with the timing chart of FIG. 5B, a switching current $I_1$ will be generated having the waveform shown in FIG. 5F. As shown therein, a step pulse is generated upon detection of the leading edge of each data pulse, which step pulse is of a predetermined amplitude and duration and is followed, upon opening of switch 47, by a pedestal level pulse corresponding to the steady state condition until a subsequent data transition is sensed. Switch 42 is then opened and switch 41 is closed, simultaneously with the closure of switch 47 and generation of a return step pulse.

The currents $I_1$ and $I_2$ proceed in opposite directions through the winding 40. Thus, the common polarity thereof as represented by the waveforms of FIGS. 5F and 5G is equivalent to opposite polarity current pulses as shown in FIG. 3A with regard to the generation of opposite polarity flux fields in the gap of the magnetic write head represented by the winding 40. Further, with regard to FIG. 3A in which the opposite polarity relationship has been shown, it will be appreciated that the waveforms of FIGS. 5F and 5G are idealized square wave current pulses and, due to reactances in the circuit, would more closely appear in actual waveform as shown in FIG. 3A.

Figure 6:
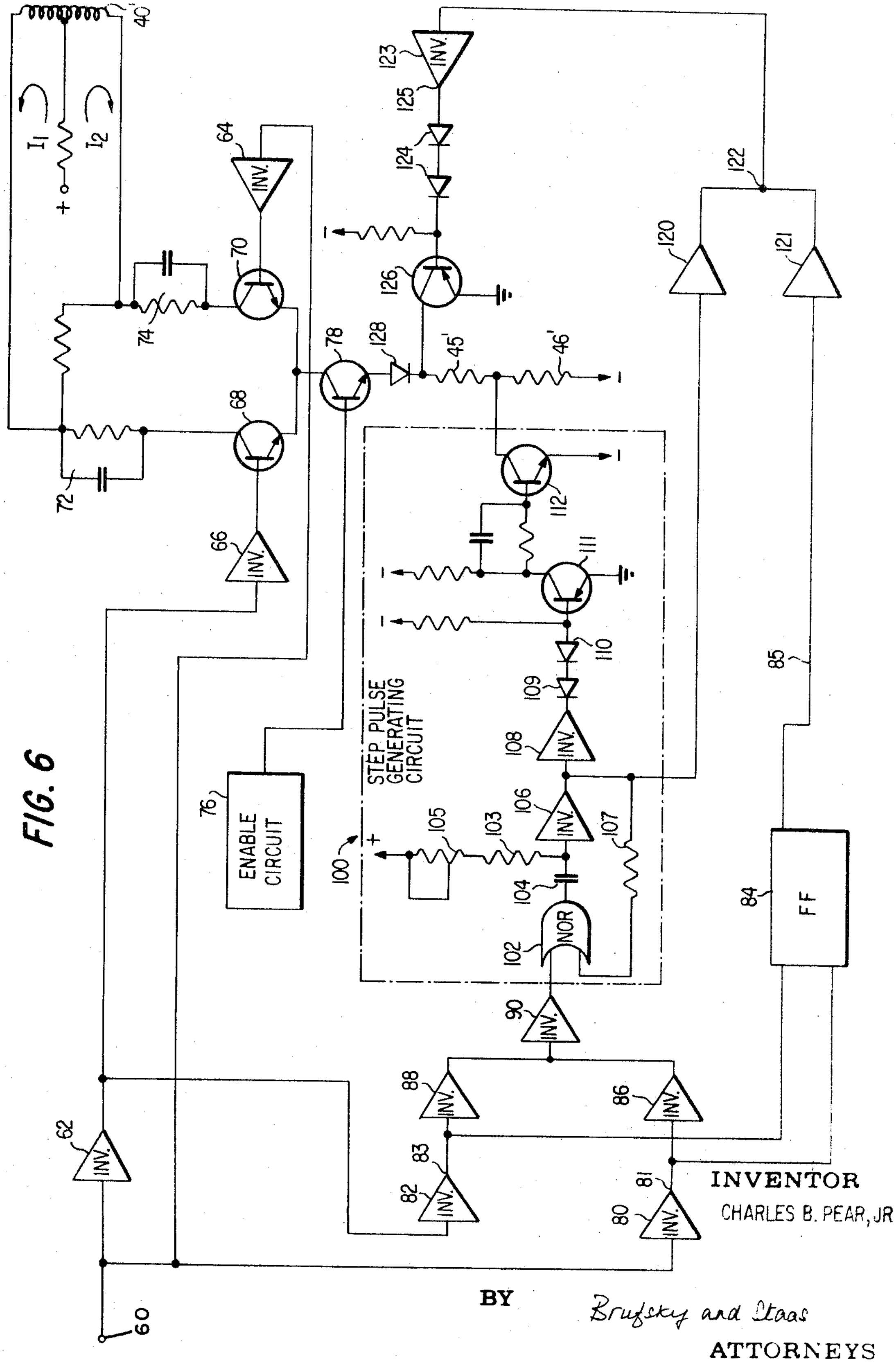
FIG. 6 comprises a schematic, partially in block diagram form, of a circuit including logic, timing, and control systems for producing the described operations of the circuit of FIG. 4.

In FIG. 6 is shown a schematic of a circuit including logic, timing, and control systems for producing the switching operations described with respect to the circuit of FIG. 4. Incoming square wave data pulses are received at input terminal 60 and applied to an inverter 62. The original and inverted forms of the input data are respectively applied to inverters 64 and 66, the outputs of which control the operation of respectively associated drive transistors 70 and 68. The drive transistors 68 and 70 are alternately switched to the conductive states for enabling the flow of currents $I_1$ and $I_2$ through the corresponding sections of the center tap winding 40′, the latter corresponding to winding 40 in FIG. 4. Conventional overdrive circuits 72 and 74 may be provided in the load circuit of the drive transistors 68 and 70 in a manner and for a purpose will known in the art.

The waveform and amplitude of the currents $I_1$ and $I_2$ which flow during the alternate conducting intervals of the drive transistors 68 and 70, respectively, are selectively controlled as described hereafter. If desired, an enable circuit 76 may control transistor 78 to render the latter conductive and thus to provide a basic on-off function for the entire head drive circuit. Such an enable circuit is desirable to assure that inadvertent writing over or, the equivalent, erasing of previously recorded information is not effected during reading of the tape.

The oppositely phased, original and inverted versions of the data are supplied from the input terminal 60 and the output of inverter 62 to corresponding inverter circuits 80 and 82. The circuits 80 and 82 each respond to negative going trailing edges of the signal received at the input thereof to produce positive going output pulses at their respective outputs 81 and 83. There is thereby produced at the outputs 83 and 81, respectively, a positive pulse in response to each leading and each trailing edge of each data pulse of the input. The outputs 81 and 83 are supplied to the input terminals of a bistable flip-flop 84 such that the latter is set at the leading edge of each data pulse and reset at the trailing edge thereof to produce at its output 85 an output waveform substantially identical to that of the input data and thus substantially corresponding to the waveform of FIG. 5B.

The outputs 81 and 83 are further supplied to buffer circuits 86 and 88, conveniently inverters, the outputs of which are combined and supplied to a further inverter 90. There is thus produced at the output of inverter 90 a train of positive pulses corresponding to the occurrence of each leading and each trailing edge of the data pulses.

The output of inverter 90 is supplied to the input of a step pulse generating circuit 100, and particularly to a first input of NOR circuit 102 thereof. The output of NOR circuit 102 is connected through coupling capacitor 104 to the input of an inverter 106, the output of which is connected to a buffer circuit such as inverter 108 which, in turn, controls a power switching circuit to be described.

The capacitor 104 comprises the capacitive portion of an adjustable RC time constant circuit including a fixed resistor 103 and an adjustable resistor 105 connected in series to a positive power supply terminal. Further, the output of inverter 106 is connected through resistor 107 to the input of NOR circuit 102 as a type of feedback or reset connection.

In operation of the circuit 100 as thus far described, NOR circuit 102 is normally in an off condition producing a positive output in the absence of a positive input at either of its input connections. Inverter 106 is normally in an on state as a result of the positive output of NOR gate 102, producing a negative output which is coupled to the second input of NOR gate 102 through the feedback loop, consistent with maintaining NOR gate 102 in the off condition. Inverter 108 responds to the negative output of inverter 106 to maintain approximately ground potential at its output.

When either a leading or a trailing edge of a data pulse is detected, the positive output signal from inverter 90 is applied to the input of NOR gate 102, switching the latter to an on condition and producing a negative or ground potential pulse at the output thereof. A charging path for the RC time constant circuit 103–105 is thereby completed. The potential at the junction of capacitor 104 and resistor 103 initially is at substantially ground potential. The inverter 106 thereby produces a positive output which, through the feedback circuit maintains NOR gate 102 in the off condition and causes inverter 106 to continue to produce a positive output signal. This condition is maintained for a time duration dependent upon the rate of charging of the capacitor 104, which rate is, in turn, selectively adjustable by the setting of the variable resistor 105. Thus, in accordance with a preselected time interval, capacitor 104 will be charged to a sufficiently positive potential to cause inverter 106 to again produce a negative output which, through the feedback circuit, switches NOR gate 102 to its normally off condition and terminates the charging operation. Capacitor 104 thereupon discharges. The negative output from inverter 106 causes inverter 108 to switch to its normal condition and establish approximately ground potential at its output.

There is thus produced at the output of inverter 106 a positive going pulse of controlled duration in response to, and commencing simultaneously with, the leading and trailing edges of each data pulse. Inverter 108 responds to these positive step pulses to produce an inverted train of negative potential pulses which are applied through the protective diodes 109 and 110 to the base of control transistor 111, the latter operating substantially as an inverter to produce positive output going pulses at its collector. This train of positive going pulses is coupled through a conventional biasing circuit to the base of a power or drive transistor 112 to render the latter conductive in response to each such positive output pulse and during the interval of each step pulse. The transistor 112 operates essentially as a switch, effectively clamping the potential of the collector terminal thereof to the potential of its emitter terminal for the interval of each step pulse.

The step pulses thus produced at the output of inverter 106 are also combined with the reproduced data waveform on output lead 85 of flip-flop 84 through buffer inverters 120 and 121 at a common junction 122. The combined waveform of junction 122 is, in turn, connected to the input of an inverter 123 to produce at the output thereof a waveform corresponding to the timing chart of FIG. 5E. As described, this waveform comprises positive square wave pulses of a time duration including the data pulse and the associated return step pulse. This positive pulse waveform is applied through protective diodes 124 and 125 to the base of a power switching transistor 126. Transistor 126 acts essentially as a switch and is rendered nonconductive during the positive portions of the pulse wave input thereto, and is rendered conductive, effectively clamping the potential of the collector terminal thereof to ground potential, during the negative or ground potential portions of the input waveform.

Transistor 126 cooperates with the enable circuit 76 to control conduction in the collector-emitter path of the transistor 78. Particularly, the enable circuit 76 maintains a bias potential at the base of transistor 78 which is below ground potential for enabling conduction of transistor 78 and, for disabling conduction thereof, produces an even more negative bias potential at the base terminal. Thus, when transistor 126 is rendered conductive, the diode 128 and the base-emitter diode of the transistor 78 are back-biased, and the flow of current in the collector-emitter path of the transistor 78 is terminated.

The load impedance of transistor 78 includes the series connected resistors 45' and 46' corresponding to the resistors 45 and 46 of FIG. 4. It will be apparent, therefore, that the combination of transistors 78 and 126 provides for the switching function of switch 44 of FIG. 4. In addition, the series connection of resistors 45' and 46' is connected to the collector terminal of transistor 112 at the output of the step pulse generating circuit 100. The circuit 100 therefore provides the switching function of switch 47 in FIG. 4. As noted previously, the drive transistors 68 and 70 perform the switching functions of switches 41 and 42, respectively, of FIG. 4. Thus, reference to the description of the operation of the circuit of FIG. 4 in conjunction with the timing charts and waveforms of FIGS. 5A through 5G will serve to explain the operation of the circuit of FIG. 6 in generating current waveforms in accordance with the invention. The circuit of FIG. 6 is merely an illustrative example of a circuit capable of providing the necessary logic and control circuits for the generation of a waveform in accordance with the invention, and any other suitable circuit may be employed in the alternative.

What is claimed is:

1. A method for recording binary information in a premagnetized magnetic recording medium wherein information is recorded as a transition of the direction of magnetization of the medium between the premagnetized and reverse directions of magnetization, comprising the steps of:

generating a switching field during a switching interval for switching the magnetization of the medium from the premagnetized direction to a reversed direction for recording information as a switching flux transition in the medium, generating a return magnetic field during a return interval for switching the magnetization of the medium from the reverse to the premagnetized direction for recording information as a return flux transition in the medium, and terminating or substantially terminating the return magnetic field after recording the return flux transition and in advance of recording the next switching flux transition.

2. A recording method as recited in claim 1 further comprising:

controlling the value of the switching magnetic field to limit the switched direction of magnetization to less than full saturation of the medium.

3. A recording method as recited in claim 1 further comprising:

generating a switching magnetic field of relatively large value for a short time interval comprising a first portion of said switching interval and reducing the switching magnetic field to a smaller value for the duration of said switching interval, and generating a return magnetic field of relatively large value for a short time interval comprising a first portion of said return interval and reducing the return magnetic field to zero value for the duration of said return interval.

4. A recording method as recited in claim 3 further comprising:

generating a return magnetic field during said first portion of the return interval of equal value but opposite sense to that of said switching magnetic field generated during said first portion of the switching interval.

5. In a method for recording binary information in a premagnetized magnetic recording medium wherein the medium is transported past magnetic transducer means responsive to an electrical recording current supplied thereto for generating a magnetic field for controlling the direction of magnetization of the medium and information is recorded as transitions of the direction of magnetization of the medium between the premagnetized and reverse directions, the improved recording method for high density recording of information comprising:

generating an electrical switching pulse during a switching interval in response to information to be recorded, supplying the switching pulse to the transducer means for establishing a switching magnetic field to switch the direction of magnetization in a corresponding region of the medium from the premagnetized direction to a reverse direction for recording the information as a switching flux transition in the medium, generating an electrical return pulse during a return interval in response to subsequent information to be recorded, supplying the return pulse to the transducer means for establishing a return magnetic field to return the direction of magnetization from the switched direction to the premagnetized direction for recording information as a return flux transition in the medium, and terminating or substantially terminating the return pulse after recording the return flux transition and in advance of supplying a subsequent switching pulse to the transducer means.

6. A recording method as recited in claim 5 further comprising controlling the amplitude of the switching pulse to limit the switched direction of magnetization in each region to less than full saturation of the medium.

7. A recording method as recited in claim 6 further comprising generating a step pulse at the initiation of each switching pulse and exceeding the controlled amplitude thereof to effect an overdrive of the switching magnetic field to produce a rapid switching flux transition at the beginning of each region.

8. A recording method as recited in claim 7 further comprising controlling the amplitude and duration of the switching step pulse.

9. A recording method as recited in claim 8 further comprising generating a return pulse of equal amplitude and duration to the switching step pulse, and supplying the return pulse to the transducer means for establishing a return magnetic field of opposite sense to the switching magnetic field produced in response to the switching step pulse.

10. In a system for recording binary information on a premagnetized magnetic recording medium wherein there are provided magnetic transducer means responsive to electrical recording current pulses supplied thereto for generating a magnetic field for controlling the direction of magnetization of the medium, and wherein information is recorded as the transition of the direction of magnetization of the medium between the premagnetized and reverse directions, the improvement comprising:

means for generating an electrical switching pulse in response to information to be recorded and for supplying the electrical switching pulse to the transducer means for establishing a switching magnetic field for switching the direction of magnetization of the medium from the premagnetized to the reverse direction for recording information as a switching flux transition in the medium, means for generating an electrical return pulse in response to information to be recorded and for supplying the electrical switching pulse to the transducer means for establishing a return magnetic field for returning the direction of magnetization of the medium from the switched to the premagnetized direction for recording information as a return flux transition in the medium, and said return pulse generating means reducing the value of the return pulse to zero after recording the return flux transition and in advance of recording the next switching flux transition.

11. A recording system as recited in claim 10 wherein:

said switching pulse generating means includes means for generating an electrical switching pulse of relatively large value for a short time interval comprising a first portion thereof and for reducing the switching pulse to a smaller value for the duration thereof, and said return pulse generating means generates an electrical return pulse of relatively large value for a short time interval corresponding to that of the first portion of the electrical switching pulse but of opposite sense.

12. A recording system as recited in claim 11 wherein said electrical switching pulse means includes means for controlling the amplitude thereof following the first portion of a switching pulse to limit the switched direction of magnetization to less than full saturation of the medium.

13. A recording system as recited in claim 12 wherein:

said switching pulse and said return pulse generating means include means for independently controlling the amplitude and duration of said switching pulse in the first portion thereof and of the corresponding, but opposite sense return pulse.

* * * * *